United States Patent [19]
Hashimoto et al.

[11] Patent Number: 5,747,157
[45] Date of Patent: May 5, 1998

[54] MAGNETIC RECORDING MEDIUM

[75] Inventors: Hiroshi Hashimoto; Yuichiro Murayama; Masaki Satake; Tsutomu Okita, all of Odawara, Japan

[73] Assignee: Fuji Photo Film Co., Ltd., Kanagawa, Japan

[21] Appl. No.: 705,268

[22] Filed: Aug. 29, 1996

[30] Foreign Application Priority Data

Aug. 30, 1995 [JP] Japan ................... 7-222041

[51] Int. Cl.$^6$ ................... G11B 5/702
[52] U.S. Cl. ........... 428/332; 428/336; 428/694 BG; 428/694 BU; 428/694 BL; 428/694 BS; 428/900
[58] Field of Search ............... 428/694 BU, 694 BL, 428/694 BS, 423.1, 425.9, 900, 332, 336, 694 BG, 694 BY

[56] References Cited

U.S. PATENT DOCUMENTS 5,413,862  5/1995  Murata et al. ............ 428/694 BL
5,458,948  10/1995 Yanagita et al. .......... 428/694 BS

FOREIGN PATENT DOCUMENTS 61-148626  7/1986  Japan.
61-190717  8/1986  Japan.
1-267829  10/1989  Japan.
6-076265  3/1994  Japan.
6-096437  4/1994  Japan.

*Primary Examiner*—Christopher D. Rodee
*Attorney, Agent, or Firm*—Sughrue, Mion, Zinn, Macpeak & Seas, PLLC

[57] ABSTRACT

The invention relates to a binder which improves the dispersibility of ferromagnetic powders and makes it possible to achieve a magnetic recording medium excellent in operation durability and storability, and a magnetic recording medium using such a binder. The invention provides a magnetic recording medium including a non-magnetic support substrate and a magnetic layer formed on said support substrate, said magnetic layer comprising a dispersion of ferromagnetic fine powders in a binder, wherein said binder comprises a polyurethane resin that is a reaction product obtained by using a polyol and an organic diisocyanate as main starting materials, said polyurethane resin containing as components of said polyol 15 to 40% by weight of a short-chain diol component having a cyclic structure, and 10 to 50% by weight of a long-chain polyether polyol component, and further including a polar group-containing long-chain polyol component having a molecular weight of 500 to 5,000.

6 Claims, No Drawings

MAGNETIC RECORDING MEDIUM

BACKGROUND OF THE INVENTION

The present invention relates generally to a magnetic recording medium including a non-magnetic support substrate and a magnetic layer formed thereon, which comprises a dispersion of ferromagnetic fine powders in a binder, and more particularly to a magnetic recording medium having very excellent electromagnetic characteristics and durability.

Magnetic recording media have wide applications in the form of recording tapes, video tapes, floppy disks, and the like. A typical magnetic recording medium includes a magnetic layer stacked on a non-magnetic support substrate, said magnetic layer comprising a dispersion of ferromagnetic powders in a binder.

Magnetic recording media are required to have an ever higher level of various characteristics such as electromagnetic characteristics, operation durability, and operation performance. In other words, audio tapes for recording and playing back music must be capable of reproducing original sounds at an ever higher level of fidelity, and video tapes must be excellent in terms of electromagnetic characteristics such as the capability of reproducing original images.

Magnetic recording media are thus required to have such excellent electromagnetic characteristics and, at the same time, must have such good-enough operation durability as mentioned just above. To achieve satisfactory operation durability, abrasives and lubricants are generally incorporated in their magnetic layer.

To achieve excellent operation durability by the addition of an abrasive material, however, it is necessary to increase the amount of the abrasive material added to some degrees, but this results in a decrease in the packing or filling degree of ferromagnetic powders. When an abrasive material having a large particle diameter is used to obtain high operation durability, it is much likely that abrasive particles are exposed to the surface of a magnetic layer. Thus, the use of the abrasive material to improve operation durability often leads to another problem, i.e., some considerable deterioration of the aforesaid electromagnetic characteristics.

To improve operation durability by a lubricant, it is again necessary to increase the amount of the lubricant added, but this makes it likely for the binder to be plasticized, so ending up in a lowering of the durability of the magnetic layer.

As a matter of course in this case, the binder that is one major component forming the magnetic layer, too, plays an important role in improving operation durability and electromagnetic characteristics. Problems with conventionally available resins such as vinyl chloride, cellulose, urethane, and acrylic resins are that they render the magnetic layer poor in wear resistance, and contaminate members over which magnetic tapes are to pass.

To eliminate these problems, it has so far been put forward to increase the hardness of a magnetic layer using a tough binder.

For instance, JP-B-58-41565 refers to a —$SO_3M$-containing polyurethane binder where polyester polyol is used as polyol, and discloses a synthesis example using a compound containing 70% by weight of a long-chain diol. JP-A-6-96437 discloses a magnetic recording medium using a resin comprising an urethane resin containing an urethane having at least 2.5 mmol/g of an urethane group, and polyvinyl acetal. JP-B-6-19821 refers to an urethane urea binder wherein the sum of urethane and urea is 1.8 to 3.0 mmol/g, viz., a binder containing 76% weight of a long-chain diol, and alleges that it is desired that the ratio of long-chain diol/short-chain diol is up to ⅓, that is, the content of the long-chain diol is at least 25% by weight. These provide a magnetic layer that has high film strength and excels in durability due to an increased urethane bond concentration, but have a disadvantage of providing a coating solution having an increased viscosity, which in turn causes the dispersibility of ferromagnetic powders to decrease, and the electromagnetic characteristics of the resulting magnetic recording medium to become worse.

JP-A-6-76265 discloses to use a polyurethane resin obtained from a polyester diol comprising at least one polyhydric alcohol having a branched chain and a diisocyanate, and JP-A-61-148626 discloses a polyurethane resin wherein at least 20% by weight of a long-chain diol component is composed mainly of a bisphenol or its derivative and an aromatic dibasic acid or its derivative. These provide a coating film of excellent durability due to the presence of a cyclic structure, but have a demerit of being poor in solubility in solvents due to the presence of a cyclic structure, and so causing the dispersibility of ferromagnetic powders to become insufficient.

JP-A-1-267829 discloses that a polyurethane resin contains a polyether polyol having a cyclic structure, and an ethylene oxide or propylene oxide adduct of bisphenol A, and hydrogenated bisphenol A is used as a diol (having a molecular weight of 250 to 3,000), and shows in its example that the urethane is synthesized from polyol and MDI. However, the resultant coating film becomes soft due to much polyol content, and so becomes worse in terms of operation durability.

JP-A-61-190717 discloses to use polytetramethylene glycol and polycaprolactone polyol as part of polyurethane resin, and shows in its example that the polyol content exceeds 70% by weight. This suggests that the resultant coating film is too soft to cause dust and fluff to accumulate on heads, ending up in a durability drop.

The aforesaid publications describe that long-chain diols having hydrophilic segments, for instance, polyester, polyether, and polycarbonate are used for polyurethane resins and polyurethane urea resins used as binders for magnetic recording media, and show in their examples that the resins contain at least 25 mol % or at least 50% by weight of long-chain diols.

However, a grave demerit associated with the aforesaid polyurethane and polyurethane urea resins is that because of having hydrophilic segments as mentioned just above, they become poor in affinity for an organic solvent to make the coalescence of hydrophilic polar groups likely to occur, and so inhibit the spreading-out of molecular chains in the organic solvent, resulting in the dispersion of ferromagnetic fine powders being inhibited.

A serious problem associated with these long-chain diols having hydrophilic segments is that when they are polyesters, ester bond groups are likely to hydrolyze resulting in a storability drop, and when they are polyethers such as polytetramethylene ether glycol, polypropylene glycol or polyethylene glycol, they are poor in heat resistance due to their low Tg, and become soft with a strength drop.

An object of the present invention is to provide a magnetic recording medium which holds ferromagnetic powders with an extremely high dispersibility, excels not only in ferromagnetic powder dispersion stability, and productivity, but also in long-term storability, and excels in durability under a wide range of temperature and humidity conditions.

SUMMARY OF THE INVENTION

The present invention provides a magnetic recording medium including a non-magnetic support substrate and a magnetic layer formed on said support substrate, said magnetic layer comprising a dispersion of ferromagnetic fine powders in a binder, wherein:

said binder comprises a polyurethane resin that is a reaction product obtained by using a polyol and an organic diisocyanate as main starting materials, said polyurethane resin containing as components of said polyol 15 to 40% by weight of a short-chain diol component having a cyclic structure, and 10 to 50% by weight of a long-chain polyether polyol component, and further including a polar group-containing long-chain polyol component having a molecular weight of 500 to 5,000.

In the aforesaid magnetic recording medium, it is preferable that the polar group-containing long-chain polyol component contains a polar group at an amount of $1 \times 10^{-5}$ eq/g to $2 \times 10^{-4}$ eq/g with respect to the overall polyurethane resin.

In the aforesaid magnetic recording medium, it is preferable that the polar group-containing long-chain polyol component contains at least one polar group selected from the group consisting of $-SO_3M$, $-OSO_3M$, $-COOM$, $-PO_3M_2$, $-OPO_3M_2$, $-NR_2$, and $-N^+R_2R'COO^-$ where M is a hydrogen atom, an alkali metal or ammonium, and R and R' each are an alkyl group having 1 to 12 carbon atoms.

In the aforesaid magnetic recording medium, it is preferable that the polyurethane resin contains 3 to 20 OH groups per molecule.

The present invention also provides a magnetic recording medium in which a coating solution comprising a dispersion of ferromagnetic powders in said binder is coated on a non-magnetic support substrate to form a magnetic layer thereon, wherein:

a non-magnetic layer comprising a dispersion of inorganic non-magnetic powders in a binder is intercalated between the non-magnetic support substrate and the magnetic layer, and the magnetic layer has a thickness of up to 1 µm.

In the aforesaid magnetic recording medium, it is preferable that the aforesaid polyurethane resin is used as the binder for dispersing the inorganic non-magnetic powders therein.

DESCRIPTION OF THE PREFERRED EMBODIMENTS

The short-chain diol having a cyclic structure herein used as one starting material for the polyurethane resin according to the present invention may be selected from the group consisting of aliphatic or aromatic diols such as bisphenol A, hydrogenated bisphenol A, bisphenol S, hydrogenated bisphenol S, bisphenol P, hydrogenated bisphenol P, cyclohexanedimethanol, cyclohexanediol and hydroquinone, and ethylene oxide or propylene oxide adducts thereof, and should preferably have a molecular weight less than 500.

Among these, preference is given to bisphenol A, hydrogenated bisphenol A, and ethylene oxide or propylene oxide adducts thereof. Notice that the hydrogenated bisphenol A is particularly preferable.

The amount of the short-chain diol having a cyclic structure, contained in the polyurethane resin is 15 to 40% by weight, preferably 20 to 35% by weight, and more preferably 22 to 30% by weight. At less than 15% by weight, the resultant coating film becomes too soft to obtain sufficient strength, resulting in a drop of still durability. At more than 40% by weight, on the other hand, the diol is poor in solubility in solvents, and makes the dispersibility of ferromagnetic powders low, thus making it impossible to obtain a magnetic recording medium excellent in electromagnetic characteristics.

The ether group-containing long-chain diol that is another starting material for the polyurethane resin according to the present invention may be polyalkylene glycols such as polypropylene glycol, polyethylene glycol and polytetramethylene glycol, and polyether polyols obtained by the addition of polyethylene oxide and/or polypropylene oxide to cyclic diols such as bisphenol A, hydrogenated bisphenol A, bisphenol S and bisphenol P.

It is preferable to use a propylene oxide adduct of bisphenol A, an ethylene oxide adduct of bisphenol A, an ethylene oxide adduct of hydrogenated bisphenol A, and a propylene oxide adduct of hydrogenated bisphenol A, each having a molecular weight of 500 to 5,000, and preferably 600 to 3,000. At more than 5,000 the resultant coating film decreases in terms of Tg and strength and, hence, durability.

The ether content of the polyurethane resin is preferably 1 to 5 mmol/g, and particularly preferably 2 to 4 mmol/g. When the ether content of the polyurethane resin is less than 1 mmol/g, there is a decrease in the dispersibility of ferromagnetic powders due to its decreased adsorptivity to a magnetic material. At more than 5 mmol/g there is again a decrease in the dispersibility of ferromagnetic powders due to its decreased solubility in solvents.

In accordance with the present invention, a coating film of high strength, excellent durability, richness in solubility in solvents, and excellent dispersibility of ferromagnetic powders are achievable because the polyurethane resin has a cyclic structure.

The polar group of the polar group-containing long-chain polyol that is the second starting material for the polyurethane according to the present invention may be selected from the group consisting of $-SO_3M$, $-OSO_3M$, $-COOM$, $-PO_3M_2$, $-OPO_3M_2$, $-NR_2$ and $-N^+R_2R'COO^-$ where M is a hydrogen atom, an alkali metal or ammonium, and R and R' each are an alkyl group having 1 to 12 carbon atoms.

Usable for the polyol skeleton structure are polyester polyol, polyether polyol, polyether ester polyol, polycarbonate polyol, and so on.

More illustrative mention is made of polar group-containing polyester polyols obtained by the dehydration and condensation of polar group-containing dicarboxylic acids or glycols, for instance, sodium 5-sulfoisophthalate, potassium 5-isophthalate, sodium sulfoterephthalate, potassium terephthalate, sodium 2-sulfo-1,4-butanediol, potassium 2-sulfo-1,4-butanediol, sodium bis(2-hydroxyethyl) phosphite, dimethylol propionate, sodium dimethylol propionate and sodium sulfosuccinate, with other glycols or dicarboxylic acids, polar group-containing polyester polyols obtained by the ring opening polymerization of lactones such as ε-caprolactone using the aforesaid polar group-containing diol as an initiator, and polar group-containing polyether diols obtained by the addition of alkylene oxides such as ethylene oxide and propylene oxide to polar group-containing diols.

The other glycols used for the aforesaid polyester polyols, for instance, include aliphatic glycols such as ethylene glycol, 1,3-propanediol, propylene glycol, neopentyl glycol, 1,4-butanediol, 1,5-pentanediol, 1,6-hexanediol, 1,8- octanediol, 1,9-nonanediol, diethylene glycol and dipropylene glycol, and alicyclic glycols such as cyclohexanediol and cyclohexanedimethanol.

The other dicarboxylic acids used, for instance, include aliphatic or aromatic dicarboxylic acids such as succinic acid, adipic acid, sebacic acid, azelaic acid, phthalic acid, isophthalic acid, terephthalic acid, and naphthalenedicarboxylic acid.

Preference is given to polyester polyol obtained by the dehydration and condensation of sodium 5-sulfoisophthalate/isophthalic acid/neopentyl glycol, polyester polyol obtained by the ring opening polymerization of ε-caprolactone using an ethylene oxide adduct of potassium 5-sulfoisophthalate as an initiator, polyether polyol obtained by the addition of propylene oxide to sodium 2-sulfo-1,4-butanediol, and so on.

Molecular weight ranges from 500 to 5,000, and preferably from 600 to 2,500.

Upon polar groups introduced into the polyurethane using this polyol, the distribution of polar groups in a polyurethane molecule becomes narrow, resulting in improvements in dispersibility and dispersion stability.

The polar group content of the polyurethane ranges preferably from $1 \times 10^{-5}$ eq/g to $2 \times 10^{-4}$ eq/g. Too much polar groups are likely to increase the viscosity of a solution due to association between the polar groups, ending up in a dispersibility drop.

The polyurethane resin according to the present invention has a glass transition temperature (Tg for short) of preferably 45° to 120° C., and more preferably 50° to 90° C. A polyurethane resin having a Tg below the lower limit provides a coating film of decreased strength and so provides a magnetic recording medium of decreased operating durability, whereas a polyurethane resin having a Tg exceeding 120° C. provides a coating film poor in the ability to be calendered and, hence, provides a magnetic recording medium having decreased electromagnetic characteristics.

The polyurethane resin according to the present invention has a weight-average molecular weight of 10,000 to 200,000, preferably 10,000 to 100,000, more preferably 20,000 to 80,000, and most preferably 30,000 to 70,000. A polyurethane resin having a weight-average molecular weight lower than 10,000 provides a coating film of decreased strength, and so is likely to provide a magnetic recording medium poor in operating durability, whereas a polyurethane resin having a weight-average molecular weight more than 200,000 is less soluble in solvents, and so tends to drop in terms of ferromagnetic powder dispersibility.

Short-chain diols except the aforesaid diols may be used in combination with the polyurethane resin according to the present invention. More illustrative mention is made of aliphatic, and alicyclic diols such as ethylene glycol, 1,3-propylenediol, 1,2-propylene glycol, 1,4-butanediol, 1,5-pentanediol, 1,6-hexanediol, 2,2-dimethylpropanediol, 1,8-octanediol, 1,9-nonanediol, diethylene glycol, cyclohexane-1,4-diol and cyclohexane-1,4-dimethanol.

Exemplary organic diisocyanate compounds contained in the polyurethane according to the present invention as the third starting material are aromatic diisocyanates such as 2,4-tolylene diisocyanate, 2,6-tolylene diisocyanate, xylene-1,4-diisocyanate, xylene-1,3-diisocyanate, 4,4'-diphenylmethane diisocyanate, 4,4-diphenyl ether diisocyanate, 2-nitrodiphenyl-4,4'-diisocyanate, 2,2'-diphenylpropane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate and 3,3'-dimethoxydiphenyl-4,4-diisocyanate, aliphatic diisocyanates such as tetramethylene diisocyanate, hexamethylene diisocyanate and lysine diisocyanate, and alicyclic diisocyanates such as hydrogenated tolylene diisocyanate and hydrogenated diphenylmethane diisocyanate.

The diisocyanate compound used for the polyurethane is contained in the binder at an amount of preferably 10 to 50% by weight, and more preferably 20 to 40% by weight.

When the binder according to the present invention is used for the magnetic layer, a vinyl chloride type of synthetic resin may be used in combination with the polyurethane resin according to the present invention. The usable vinyl chloride type of synthetic resin has a polymerization degree of preferably 100 to 600, and more preferably 200 to 450. The vinyl chloride type of synthetic resin used may have been obtained by the copolymerization of vinylic monomers, e.g., vinyl acetate, vinyl alcohol, vinylidene chloride and acrylonitrile. The polyurethane resin according to the present invention may also be used in combination with cellulose derivatives such as nitrocellulose, acrylic resin, polyvinylacetal resin, polyvinylbutyral resin, epoxy resin, phenoxy resin, and so on, which may be used alone or in combination of two or more.

When these other synthetic resins are used in combination with the polyurethane resin according to the present invention, the polyurethane resin used for the magnetic layer is contained in the binder at an amount of preferably 10 to 100% by weight, more preferably 20 to 100% by weight, and most preferably 50 to 100% by weight. At lower than 10% by weight, the binder becomes worse in terms of solubility in solvents, and so suffers from a drop of dispersibility.

The vinyl chloride type of resin is contained in the binder at an amount of preferably 10 to 80% by weight, more preferably 20 to 70% by weight, and most preferably 30 to 60% by weight.

For the magnetic layer according to the present invention a curing agent may be used together with the binder. As the curing agent, polyisocyanate, epoxy and other curing agents may be used although the polyisocyanate curing agent is preferable. Exemplary polyisocyanate curing agents include the aforesaid organic diisocyanate compounds, and reaction products of the aforesaid diisocyanates with polyhydric alcohols such as trimethylolpropane and glycerin, e.g., a reaction product of 3 moles of tolylene diisocyanate with 1 mole of trimethylolpropane, a reaction product of 3 moles of xylylene diisocyanate or hexamethylene diisocyanate with 1 mole of trimethylolpropane, and the like. An isocyanurate type of polyisocyanates obtained by the polymerization of diisocyanate compounds may also be used, which include trimers, pentamers and heptamers of tolylene diisocyanate, hexamethylene diisocyanate, and the like. Polymeric MDI that is a polymer of MDI, too, may be used.

When curing is effected by irradiation with electron radiation, compounds having a reactive double bond such as urethane acrylate may be used.

Usually, the total amount of the resin component and curing agent (i.e., the binder) ranges preferably from 15 to 40 parts by weight, and more preferably from 20 to 30 parts by weight per 100 parts by weight of ferromagnetic powders.

The ferromagnetic powder used for the magnetic recording medium according to the present invention is a powder of ferromagnetic iron oxide, cobalt-containing ferromagnetic iron oxide or ferromagnetic alloy, which has an $S_{BET}$ specific surface area of 40 to 80 m²/g, and preferably 50 to 70 m²/g. Crystallite size lies in the range of 12 to 25 nm, preferably 13 to 22 nm, and more preferably 14 to 20 nm. Major axis length lies in the range of 0.05 to 0.25 μm, preferably 0.07 to 0.2 μm, and more preferably 0.08 to 0.15 μm. Exemplary powdery ferromagnetic metals may be Fe, Ni, Fe-Co, Fe-Ni, Co-Ni, Co-Ni-Fe, and alloys which may contain at least 80% by weight of a metal component or components with the balance being aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, mercury, lead, phosphorus, lanthanum, cerium, praseodymium, neodymium, tellurium, and bismuth. The ferromagnetic metal powders may additionally contain small quantities of water, hydroxides, or oxides. Production processes of these ferromagnetic powders have already been known in the art, and so the ferromagnetic powders used herein may be produced by these known processes.

Acicular, particulate, dice-like, rice grain-like, and sheet-like forms of ferromagnetic powders may be used. Particular preference is given to using an acicular form of ferromagnetic powders.

The aforesaid resin component, curing agent and ferromagnetic powders are mixed with and dispersed in solvents ordinarily used for magnetic coating material preparation, for instance, methyl ethyl ketone, dioxane, cyclohexanone or ethyl acetate, thereby preparing a magnetic coating material. Mixing and dispersion may be carried out as usual.

It is here to be noted that the magnetic coating material may contain, in addition to the aforesaid components, abrasive materials such as α-$Al_2O_3$ and $Cr_2O_3$, antistatics such as carbon black, lubricants such as fatty acids, fatty acid esters and silicone oil, ordinarily used additives such as dispersants, or fillers.

Reference will now be made to a specific embodiment of the magnetic recording medium according to the present invention, which has a multilayer structure comprising an upper magnetic layer and a lower non-magnetic or magnetic layer.

The non-magnetic powder used for the lower non-magnetic layer may be selected from inorganic compounds such as metal oxides, metal carbonates, metal sulfates, metal nitrides, metal carbides and metal sulfides. By way of example, mention is made of α-alumina with an α-fraction of 90 to 100%, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate and molybdenum disulfide, which may be used alone or in combination of two or more. Particular preference is given to titanium dioxide, zinc oxide, iron oxide and barium sulfate among which the titanium dioxide is more particularly preferable. These non-magnetic powders should preferably have an average particle diameter of 0.005 to 2 μm. If required, however, they may be used in combination with other non-magnetic powders having a different average particle diameter, or alternatively they may have a wider particle diameter distribution. Even in either case, the same effect is achievable. More preferably, the non-magnetic powders should have an average particle diameter of 0.01 to 0.2 μm. The non-magnetic powders should more preferably lies in the pH range between 6 and 9. The non-magnetic powders should have a specific surface area of 1 to 100 m²/g, preferably 5 to 50 m²/g, and more preferably 7 to 40 m²/g. The non-magnetic powders should preferably range from 0.01 μm to 2 μm in terms of crystallite size. Oil absorption, as measured in DBP, ranges from 5 to 100 ml/100 g, preferably 10 to 80 ml/100 g, and more preferably 20 to 60 ml/100 g. Specific gravity ranges from 1 to 12, and preferably 3 to 6. Shape may be any one of acicular, spherical, polyhedral, and sheet-like forms.

Preferably, these non-magnetic powders should be treated on their surfaces with $Al_2O_3$, $SiO_2$, $TiO_2$, $ZrO_2$, $SnO_2$, $Sb_2O_3$ and ZnO. In view of improvements in dispersibility, particular preference is given to $Al_2O_3$, $SiO_2$, $TiO_2$ and $ZrO_2$, among which the $Al_2O_3$, $SiO_2$ and $ZrO_2$ are more preferable. These may be used in combination of two or more or alone. Alternatively, the non-magnetic powders may be provided with a surface layer by co-precipitation. Still alternatively, they may be treated on their surfaces with alumina and then with silica, and vice versa. In general, the surface treated layer may preferably have a uniform yet intimate, rather than porous, structure.

Carbon black is mixed with the lower layer, thereby lowering its Rs as well known in the art and obtaining a desired micro-Vickers hardness. Furnace black for rubber, thermal black for rubber, carbon black for coloring, acetylene black, etc., may be used to this end.

The carbon black used should have a specific surface area of 100 to 500 m²/g, and preferably 150 to 400 m²/g, and a DBP oil absorption of 20 to 400 ml/100 g, and preferably 30 to 200 ml/100 g. The carbon black should have an average particle diameter of 5 to 80 nm, preferably 10 to 50 nm, and more preferably 10 to 40 nm. Preferably, the carbon black should have a pH value of 2 to 10, a water content of 0.1 to 10%, and a tap density of 0.1 to 1 g/ml. Examples of the carbon black used herein are BLACKPEARLS 2000, 1300, 1000, 900, 800, 880, and 700, and VULCAN XC-72, all made by Cabot Co., Ltd.; #3050B, 3150B, 3250B, #3750B, #3950B, #950, #650, #970, #850B, and MA-600, all made by Mitsubishi Chemical Industries, Ltd.; CONDUCTEX SC, RAVEN 8800, 8000, 7000, 5750, 5250, 3500, 2100, 2000, 1800, 1500, 1255, and 1250, all made by Columbian Carbon Co., Ltd.; and Ketchen Black EC made by Aczo Co., Ltd.

When the lower layer is a magnetic layer, alloys composed mainly of γ-$Fe_2O_3$, Co-modified γ-$Fe_2O_3$, α-Fe, etc., and $CrO_2$, etc. may be used as magnetic powders. Particular preference is given to the Co-modified γ-$Fe_2O_3$. The ferromagnetic powders used for the lower layer of the present invention are preferably similar in terms of composition and performance to those used for the upper magnetic layer. To improve recording performance at long wavelengths, it is desired that the Hc of the lower magnetic layer be lower than that of the upper magnetic layer, and that the Br of the lower magnetic layer be higher than that of the upper magnetic layer.

Binders, lubricants, dispersants, additives and solvents, or dispersion or other methods used for the preparation of the lower magnetic or non-magnetic layer may be similar to those applied to the upper magnetic layer.

For the non-magnetic support substrate usable in the present invention, it is possible to use known materials such as biaxially stretched polyethylene naphthalate, polyethylene terephthalate, polyamide, polyimide, polyamidimide, aromatic polyamide and polybenzoxydazole, among which the polyethylene naphthalate and aromatic polyamide are preferable. These non-magnetic support substrates may have previously been treated by corona discharge, plasma, and heat, or may have previously be made bondable. Preferably, the non-magnetic support substrate usable in the present invention should have a surface of excellent smoothness as expressed in terms of a center line average surface roughness of 0.1 to 20 nm, and particularly 1 to 10 nm at a cut off value of 0.25 mm. It is further desired that these non-magnetic support substrates be not only low in terms of the center line average surface roughness but also free from any rough protuberance exceeding 1 µm.

A typical method of producing the magnetic recording medium according to the present invention involves coating a magnetic layer coating solution on a surface of the non-magnetic support substrate which is moving, thereby forming on that surface a magnetic layer having an as-dried thickness lying in the range of 0.05 to 5 µm, and preferably 0.07 to 1 µm. It is here to be noted that a plurality of coating materials may be coated successively or concurrently to obtain a multilayered structure.

For a coating machine for coating the aforesaid magnetic coating material it is possible to make use of various machines such as air doctor coaters, blade coaters, rod coaters, extrusion coaters, air knife coaters, squeeze coaters, dip coaters, reverse roll coaters, transfer roll coaters, gravure coaters, kiss coaters, cast coaters, spray coaters and spin coaters.

For these coating machines, one may consult "The Latest Coating Techniques" published by Sogo Gijutsu Center Co., Ltd. (May 31, 1983), for instance.

When the present invention is applied to a magnetic recording medium having a double- or multi-layer structure, for instance, use may be made of the following coating machines and methods.

(1) First, the lower layer is coated on an application surface by means of a coating machine generally applicable to the coating of coating material, for instance, a gravure, roll, blade or extrusion coating machine. While the lower layer remains undried, the upper layer is then coated thereon, using a substrate pressurizing type of extrusion coating machine disclosed typically in JP-B-1-46186, JP-A-60-238179, and JP-A-2-265672.

(2) The upper and lower layers are almost concurrently coated on an application surface, using a single coating head including two slits through which coating solutions pass, as disclosed typically in JP-A-63-88080, JP-A-2-17971, and JP-A-2-265672.

(3) The upper and lower layers are almost concurrently coated on an application surface, using an extrusion coating machine having a backup roll, as disclosed typically in JP-A-2-174965.

The non-magnetic support substrate used in the present invention may be provided with a back coat (backing) layer on its surface having no magnetic coating material applied thereon. The back coat layer applied on the magnetic coating material-free surface of the non-magnetic support substrate is a layer formed of a back coat-forming coating material comprising a dispersion of particulate components such as abrasive material and antistatics and a binder in an organic solvent. For the particulate components use may be made of various inorganic pigments and carbon black, and for the binder various resins such as nitrocellulose, phenoxy resin, a vinyl chloride type resin, and polyurethane, which may be used alone or in admixture.

It is here to be noted that adhesive layers may be provided on the surfaces of the non-magnetic support substrate on which the magnetic coating material and the back coat-forming coating material are to be applied, respectively.

The coating layer of the thus coated magnetic coating material is dried after the ferromagnetic powders contained therein have been oriented in an applied magnetic field.

After dried in this way, the coating layer is smoothed on the surface. For the surface smoothing treatment, for instance, a super calender roll assembly may be used. This surface smoothing treatment causes voids resulting from removal of the solvent by drying to vanish, resulting in an increase in the packing degree of the ferromagnetic powders in the magnetic layer. It is thus possible to obtain a magnetic recording medium having high electromagnetic characteristics.

For the calendering rolls use may be made of those built up of heat-resistant plastics such as epoxy, polyimide, polyamide and polyamidimide. For the calendering treatment use may also be made of metal rolls.

Preferably, the magnetic recording medium of the present invention should have a surface of very excellent smoothness as represented by the center line average surface roughness lying in the range of 0.1 to 4 nm, and particularly 1 to 3 nm at a cut off value of 0.25 mm. To achieve this, for instance, a magnetic layer made up of a specific ferromagnetic powder and a preselected binder may be calendered as mentioned just above. It is then desired that the calender rolls used operate at a temperature lying in the range of 60° to 100° C., preferably 70° to 100° C., and more preferably 80° to 100° C., and under a pressure lying in the range of 100 to 500 kg/cm, preferably 200 to 450 kg/cm, and more preferably 300 to 400 kg/cm.

The thus cured stack may then be formed into desired shape.

The resultant magnetic recording medium may be cut to desired size by means of a cutter or the like for use.

The polyurethane resin according to the present invention contains a substantial proportion of the aromatic or aliphatic short-chain diol having a cyclic structure, and so is higher in terms of strength and Tg than conventional polyurethane resin. In particular, it excels in repeated operation performance in high-temperature environments. Much short-chain diol content gives rise to a substantial increase in the urethane bond concentration of the polyurethane resin, which in turn cooperates with intermolecular hydrogen bonds due to urethane bonds to make strength and Tg ever higher.

A problem associated with conventional urethane resin is that as the number of urethane bonds increases, it becomes fragile. Thus, a magnetic layer made up of such urethane resin has a non-uniform section upon cut, and so is likely to crack at edges. Consequently, the magnetic layer comes to powdery pieces during operation, ending up in a dropout increase. With the polyurethane resin according to the present invention, however, it is possible to obtain a tough coating layer which, albeit having high strength and Tg, possesses a relatively large elongation at break, because it involves reasonable tradeoffs between the long-chain polyether polyol and the short-chain diol having a cyclic structure. Thus, the present invention makes it possible to provide a magnetic recording medium which is not only free from the problem that its magnetic layer comes to powdery pieces during repeated operation, but is improved in terms of durability as well; that is, it suffers from neither dropout increase nor dust and fluff accumulating on associated head.

As the concentration of the cyclic structure or urethane bonds increases, the conventional polyurethane resin becomes poor in solubility in solvents and, hence, dispersibility. By contrast, the polyurethane resin according to the present invention has an advantage of being excellent in solubility in solvents as well.

This is believed to be due largely to a suitable number of ether groups contained in the polyurethane according to the present invention; that is, they make a great contribution to improvements in solubility in solvents, and makes the polyurethane likely to be adsorbed to a magnetic material, resulting in improvements in dispersibility.

Furthermore, the short-chain diol having a cyclic structure ensures to give rise to steric hindrance in the vicinity of urethane bonds, thus making intermolecular association of urethane bonds unlikely to occur in the coating solution. Thus, the solubility in solvents does not drop even at a high urethane bond concentration, ending up in an improved dispersibility.

Among short-chain diols having a cyclic structure, aliphatic ones are preferable to aromatic ones because the former have higher solubility in solvents.

To improve dispersibility, the urethane resin of the present invention contains a polar group. As this polar group it is preferable to use a strong polar group selected from the group consisting of —$SO_3M$, —$OSO_3M$, —COOM, —$PO_3M_2$, —$OPO_3M_2$, —$NR_2$ and —$N^+R_2R'COO^-$ where M is a hydrogen atom, an alkali metal or ammonium, and R and R' each are an alkyl group having 1 to 12 carbon atoms. When a plurality of such polar groups are present per polyurethane resin molecule, they are adsorbed to the surface of a magnetic material while the rest segment of the polyurethane resin molecule exists in a molecular chain form that spreads out in a solvent. This produces a favorable action on dispersion stability. Accordingly, as the amount of the polar groups per molecule becomes too much, the whole molecular chain of the polyurethane remains adsorbed to the surface of a magnetic material, resulting in a dispersibility drop. On the other hand, too little causes the proportion of polar group-free polyurethane molecules to increase, again resulting in a dispersibility drop. If a polyurethane resin has two molecular chains, one comprising molecules having more polar groups and the other comprising molecule having no polar group at all, there is a decrease in the amount of the polyurethane resin adsorbed to the surface of a magnetic material, resulting in a dispersibility drop, especially a dispersion stability drop. This is true of even when the same amount of polar groups is contained in that polyurethane resin. To improve dispersion stability, it is thus important that both polyurethane molecular chains have polar groups at a uniform proportion.

In the polyurethane resin according to the present invention, a polar group-containing long-chain polyol highly soluble in a solvent for urethane polymerization is used to introduce polar groups uniformly therein. The polar group-containing long-chain polyol is so highly soluble in the solvent that it is uniformly mixed with other short-chain diol and long-chain polyether polyol during urethane polymerization, and so is incorporated uniformly in the resulting polyurethane molecule. Consequently, improved dispersibility is achieved because molecules free from polar groups whatsoever are unlikely to occur. It is also possible to improve dispersion stability in particular.

Moreover, the polyurethane of the present invention is particularly effective for a multilayered magnetic recording medium having a thin magnetic layer. Such a magnetic recording medium is liable to foliate due to repeated operation in a still state, resulting in a still durability drop, because the surface of the magnetic layer is smooth, and is a thin layer. However, since the polyurethane resin according to the present invention has high strength and Tg, the magnetic layer is believed to be unlikely to flow due to frictional heat with an associated head, resulting in an improved still durability.

The present invention will now be explained at great length with reference to some examples.

In the following examples, the "part" is understood to mean a "part by weight".

SYNTHESIS EXAMPLE 1

(Synthesis Example of Polyurethane Resin A)

In a vessel provided with a reflux condenser and a stirrer and previously replaced therein by nitrogen, the diol shown in Table 1 was dissolved in cyclohexanone at 60° C. in a nitrogen gas stream. For a further 15 minutes, the dissolution was continued using a catalyst or di-n-dibutyltin dilaurate at an amount of 60 ppm based on the total amount of the starting materials used. Then, the MDI shown in Table 1 was added to the solution for a 2-hour reaction by heating at 90° C., thereby synthesizing a polyurethane prepolymer having an NCO terminus. Following the determination of the NCO content of the obtained prepolymer, trimethylolpropane was added to the prepolymer at the same moles as the NCO content for a further 4-hour reaction by heating. In this way, polyurethane resins A to H, and J to N, each having a branched terminal OH, were obtained. Polyurethane resin I was prepared as mentioned above, with the exception that no trimethylolpropane was added.

It is here to be noted that the OH content was adjusted by regulating the content of the MDI shown in Table 1.

The OH contents, and molecular weights of the obtained polyurethanes are shown in Table 1. The contents of the polar groups are given in $10^{-5}$ eq/g unit.

It is here to be noted that the OH contents of the polyurethane resins were calculated from the OH number found according to Test Method JIS K0070 and the number-average molecular weight found with GPC and calculated as polystyrene, and shown in terms of the number of OH groups per molecule.

POLYURETHANE SYNTHESIS EXAMPLE 2

According to the method set forth in Example 1 of JP-A-1-267829, polyurethane resin P was synthesized using a polyol obtained by the addition reaction of ethylene oxide to bisphenol A and 4,4-diphenylmethane diisocyanate as a polyisocyanate component. The results are likewise shown in Table 1.

TABLE 1

| Poly- ure- thane | Short-chain diol having a cyclic structure, | wt. % | Long-chain diol containing ether | wt. % | Polar group-containing diol Com- pound | wt. % | Mw |
|---|---|---|---|---|---|---|---|
| A | HBpA | 15 | Compound A | 50 | a | 6 | 1000 |
| B | HBpA | 40 | Compound A | 10 | a | 8 | 1000 |
| C | HBpA | 25 | Compound A | 35 | b | 12 | 2000 |
| D | HBpA | 20 | Compound B | 35 | b | 12 | 2000 |
| E | HBpA | 30 | Compound A | 20 | c | 3.6 | 600 |
| F | HBpA | 30 | Compound A | 30 | c | 3.6 | 600 |
| G | HBpA | 20 | Compound A | 45 | c | 3.6 | 600 |
| H | HBpA | 20 | Compound A | 45 | c | 3.6 | 600 |
| I | HBpA | 20 | Compound A | 40 | c | 3.6 | 600 |
| J | HBpA | 10 | Compound A | 55 | c | 3.6 | 600 |
| K | HBpA | 45 | Compound A | 8 | d | 5 | 5000 |
| L | HBpA | 5 | Compound B | 67 | e | 6 | 6000 |
| M | HBpA | 20 | Compound C | 53 | c | 3.6 | 600 |
| N | HBpA | 20 | Compound B | 50 | c | 3.6 | 600 |

TABLE 1-continued

| P | Bisphenol A containing long-chain diol 69%; ether 8 mmol/g | | | | | |
|---|---|---|---|---|---|---|
| Poly-ure-thane | MDI wt. % | TMP wt. % | Ether content mmol/g | Amount of polar group | Number of OH per mol. | Mn |
| A | 27 | 2 | 5.0 | 6.0 | 3 | 25000 |
| B | 40 | 2 | 1.0 | 8.0 | 3 | 23500 |
| C | 26 | 2 | 3.5 | 6.0 | 3 | 23000 |
| D | 31 | 2 | 4.5 | 6.0 | 3 | 28000 |
| E | 44.4 | 2 | 2.0 | 6.0 | 3 | 25300 |
| F | 34.4 | 2 | 3.0 | 6.0 | 3 | 26000 |
| G | 27.4 | 4 | 4.5 | 6.0 | 20 | 25500 |
| H | 25.4 | 6 | 4.5 | 6.0 | 25 | 24500 |
| I | 36.4 | 0 | 4.0 | 6.0 | 2 | 26500 |
| J | 29.4 | 2 | 5.5 | 6.0 | 3 | 26500 |
| K | 40 | 2 | 0.1 | 1.0 | 3 | 25000 |
| L | 20 | 2 | 8.7 | 1.0 | 3 | 24800 |
| M | 21.4 | 2 | 5.0 | 6.0 | 3 | 23400 |
| N | 24.4 | 2 | 6.4 | 6.0 | 3 | 25000 |

In Table 1,

HBpA is an abbreviation of hydrogenated bisphenol A,

Compound A is an adduct of PO (propylene oxide) to bisphenol A, with a molecular weight of 600 and n=3 to 4, Compound B is an adduct of PO to bisphenol A, with a molecular weight of 1,000 and n=12 to 13, Compound C is an adduct of PO to bisphenol A, with a molecular weight of 500 and n=2 to 3, MDI is an abbreviation of 4,4-diphenylmethane diisocyanate, TMP is an abbreviation of trimethylolpropane, and Polar group-containing long-chain diols:

a is an SIS/IP/NPG polyester having a molecular weight of 1,000, b is an adduct of ε-caprolactone to DEIS having a molecular weight of 2,000, c is an adduct of propylene oxide to DEIS having a molecular weight of 600, d is an SIS/BD/APA polyester having a molecular weight of 5,000, e is an SIS/BD/APA polyester having a molecular weight of 6,000, and f is DEIS having a molecular weight of 245, where SIS is an abbreviation of sodium 5-sulfoisophthalate, DEIS is an abbreviation of an adduct of ethylene oxide to sodium 5-sulfoisophthalate, NPG is an abbreviation of neopentyl glycol, IP is an abbreviation of isophthalic acid, BD is an abbreviation of 1,4-butanediol, and APA is an abbreviation of adipic acid.

EXAMPLE 1

One hundred (100) parts of ferromagnetic alloy powders (having a composition of 92% Fe, 4% Zn and 4% Ni, a Hc value of 2,000 Oe, a crystallite size of 15 nm, a BET specific surface area of 59 m²/g, a major axis diameter of 0.12 μm, an aspect ratio of 7, and a as value of 140 emu/g) were pulverized in an open kneader for 10 minutes. Then, the pulverized product was mixed and kneaded with 7.5 parts of a compound obtained by adding sodium hydroxyethylsulfonate to a copolymer of vinyl chloride/vinyl acetate/glycidyl dimethacrylate at an 86/9/5 proportion ($SO_3Na=6\times10^{-5}$ eq/g, epoxy=$10^{-3}$ eq/g, and Mw=30,000), 10 parts (calculated as solid) of polyurethane resin A, and 60 parts of cyclohexanone for 60 minutes. Subsequently, the resulting product was dispersed in a sand mill for 120 minutes while added thereto were:

| Abrasive material ($Al_2O_3$ with a particle size of 0.3 μm) | 2 parts |
|---|---|
| Carbon black (with a particle size of 40 nm) | 2 parts |
| Methyl ethyl ketone/toluene = 1/1 | 200 parts |
| Added to the resulting dispersion were: | |
| Polyisocyanate (Colonate 3041 made by Nippon Polyurethane Co., Ltd.) | 5 parts |
| | (calculated as solid) |
| Butyl stearate | 2 parts |
| Stearic acid | 1 part |
| Methyl ethyl ketone | 50 parts | for a further 20-minute stirring and mixing. Following this, the mixture was filtered through a filter having an average pore diameter of 1 μm to prepare a magnetic coating material.

The thus obtained magnetic coating material was coated on a surface of a 6 μm thick polyethylene naphthalate support substrate at an as-dried thickness of 2.5 μm, using a reverse roll assembly. While the magnetic coating material remained undried, the non-magnetic support substrate with the magnetic coating material applied thereon was oriented in a magnetic field created by a magnet of 3,000 gausses. The thus oriented substrate was dried, and then calendered (at a speed of 100 m/min., a linear pressure of 300 kg/cm, and a temperature of 90° C.), using a combined metal roll assembly comprising metal roll—metal roll—metal roll—metal roll—metal roll—metal roll—metal roll. After this, the product was cut to a width of 6.35 mm to fabricate a video tape for digital video tape recorders (DVCs).

EXAMPLES 2–9

Examples 2–9 were carried out as described in Example 1, with the exception that the polyurethane resins shown in Table 2 were used in place of polyurethane resin A.

EXAMPLE 10

The magnetic coating solution prepared in Example 1 was used for a magnetic solution for the upper layer.

A non-magnetic solution for the lower layer was prepared as follows.

Eighty-five (85) parts of titanium oxide (a crystal type rutile having an average particle diameter of 0.035 μm, a $TiO_2$ content of 90%, an $S_{BET}$ value of 35 to 42 m²/g, a true specific gravity of 4.1, and a pH value of 6.5 to 8.0, and provided with an alumina surface layer) were pulverized in an open kneader for 10 minutes. Then, the pulverized product was mixed and kneaded with 11 parts of a compound obtained by adding sodium hydroxyethylsulfonate to a copolymer of vinyl chloride/vinyl acetate/glycidyl dimethacrylate at an 86/9/5 proportion ($SO_3Na=6\times10^{-5}$ eq/g, epoxy=$10^{-3}$ eq/g, and Mw=30,000), 10 parts (calculated as solid) of a sulfonic acid-containing polyurethane resin (UR8700 made by Toyobo Co., Ltd.), and 60 parts of cyclohexanone for 60 minutes. Subsequently, the resulting product was dispersed in a sand mill for 120 minutes while added thereto were 200 parts of methyl ethyl ketone/cyclohexanone=1/1.

| Added to the resulting dispersion were: | |
| --- | --- |
| Butyl stearate | 2 parts |
| Stearic acid | 1 part |
| Methyl ethyl ketone | 50 parts | for a further 20-minute stirring and mixing. Following this, the mixture was filtered through a filter having an average pore diameter of 1 μm to prepare a non-magnetic coating material.

Using a reverse roll assembly, multilayer coating was carried out such that the obtained non-magnetic coating material was coated on a surface of a 10 μm thick polyethylene naphthalate support substrate at a thickness of 2.0 μm and, immediately thereafter, the magnetic coating material was coated on the non-magnetic layer at an as-dried thickness of 0.1 μm. While the magnetic coating material remained undried, the non-magnetic support substrate with the magnetic coating material applied thereon was oriented in a magnetic field created by a magnet of 3,000 gausses. The thus oriented substrate was dried, and then calendered (at a speed of 100 m/min., a linear pressure of 300 kg/cm, and a temperature of 90° C.), using a combined metal roll assembly comprising metal roll—metal roll—metal roll—metal roll—metal roll—metal roll—metal roll. After this, the product was cut to a width of 8 mm.

EXAMPLE 11

This example was carried out as described in Example 1, with the exception that polyurethane resin A was used in place of the sulfonic acid-containing polyurethane resin (UR8700) for the non-magnetic lower layer.

COMPARATIVE EXAMPLES 1-5

These comparative examples were conducted as described in Example 1, with the exception that the polyurethane resins shown in Table 2 were used in lieu of polyurethane resin A.

COMPARATIVE EXAMPLE 6

This comparative example was performed as described in Example 10, with the exception that the magnetic coating material for the upper layer was changed to the coating material used in Comparative Example 1. The characteristics of the obtained tape are shown in Table 2.

The characteristics of the magnetic recording media obtained in the aforesaid examples and comparative examples were measured by the following methods. The results are reported in Table 2.

- Measuring Methods -

(1) To measure electromagnetic characteristics, information was recorded on a sample tape at a recording wavelength of 0.5 μm and a head speed of 10 m/sec., using a drum tester (made by Koyo Seisakusho Co., Ltd.), and then reproduced therefrom. The output upon reproduction of each sample tape was estimated relative to that of the sample tape of Comp. Ex. 2 which was assumed to be 0 dB.

(2) To measure dispersion stability, a coating solution sample was held for eight hours after its preparation. Then, it was coated on a substrate to make a sample tape, which was in turn estimated in terms of electromagnetic characteristics in the same manner as mentioned just above. The output of each sample tape was estimated relative to that of a sample tape prepared by the immediate coating of the coating solution.

(3) To determine SQ, Br and Bm were measured at Hm=5 kOe using a vibration sample type of magnetic fluxmeter (made by Toei Kogyo Co., Ltd.). Then, SQ was calculated from:

$$SQ=Br/Bm$$

(4) Ra, i.e., the center line average surface roughness was determined at a cutoff value of 0.25 mm according to a light interference method using a digital optical profilometer (made by WYKO Co., Ltd.).

(5) To determine still durability, a sample tape was used on a digital video tape recorder (NV-BJ1 made by Matsushita Electric Industrial Co., Ltd.) in a still environment of 40° C. and 10% RH. Then, how long was taken until output dropped to 50% of recording signal output was measured (still endurance time). Acceptable still durability is expressed by time lengths of 60 minutes or longer, and unacceptable still durability by time lengths shorter than 60 minutes.

(6) To determine repeated operation performance, a 60-minute tape was passed repeatedly hundred times over a head of the aforesaid VTR NV-BJ1 in an environment of 40° C. and 10% RH to observe dust and fluff accumulating on the video head, and record video outputs continuously to measure an output drop assuming that the first output was 0 dB.

Dust and fluff on the video head:

Acceptable: No dust and fluff were observed.

Unacceptable: Dust and fluff were visually observed.

(6) To determine dropouts, a sample tape wound around a reel was stored for one week in an environment of 60° C. and 90% RH, and then passed repeatedly hundred times thorough the VTR used in the aforesaid (1) for five minutes per cycle in an environment of 40° C. and 10% RH. Thereafter, the number of dropouts showing a −10 dB or more output drop for 15 μsec. or longer per minute was counted. The results are given in Table 2 in terms of DO increase.

TABLE 2

| | Poly-urethane | Short-chain diol having a cyclic structure wt. % | Long-chain diol containing ether wt. % | Ether content mmol/g | Polar group-cont. diol Mw | OH group per mol. | SQ | Ra nm | EM dB | DA dB | OC dB | DF | S min. | DO |
| --- | --- | --- | --- | --- | --- | --- | --- | --- | --- | --- | --- | --- | --- | --- |
| Ex. 1 | A | 15 | 50 | 5.0 | 1000 | 3 | 0.92 | 2.2 | 1.0 | −0.1 | −0.1 | A* | A* | 1 |
| Ex. 2 | B | 40 | 10 | 1.0 | 1000 | 3 | 0.93 | 2.3 | 0.9 | −0.2 | 0.0 | A* | A* | 2 |
| Ex. 3 | C | 25 | 35 | 3.5 | 2000 | 3 | 0.93 | 2.2 | 1.1 | 0.0 | 0.0 | A* | A* | 1 |

TABLE 2-continued

|  | Poly-urethane | Short-chain diol having a cyclic structure wt. % | Long-chain diol containing ether wt. % | Ether content mmol/g | Polar group-cont. diol Mw | OH group per mol. | SQ | Ra nm | EM dB | DA dB | OC dB | DF | S min. | DO |
|---|---|---|---|---|---|---|---|---|---|---|---|---|---|---|
| Ex. 4 | D | 20 | 35 | 4.5 | 2000 | 3 | 0.93 | 2.1 | 1.1 | 0.0 | 0.0 | A* | A* | 1 |
| Ex. 5 | E | 30 | 20 | 2.0 | 600 | 3 | 0.93 | 2.3 | 0.9 | −0.4 | −0.3 | A* | A* | 0 |
| Ex. 6 | F | 30 | 30 | 3.0 | 600 | 3 | 0.93 | 2.4 | 0.8 | −0.4 | 0.0 | A* | A* | 1 |
| Ex. 7 | G | 20 | 45 | 4.5 | 600 | 20 | 0.94 | 2.5 | 0.8 | −0.4 | −0.1 | A* | A* | 1 |
| Ex. 8 | H | 20 | 45 | 4.5 | 600 | 25 | 0.93 | 2.4 | 0.7 | −0.4 | −0.1 | A* | A* | 0 |
| Ex. 9 | I | 20 | 40 | 4.0 | 600 | 2 | 0.93 | 2.4 | 0.8 | −0.4 | −0.1 | A* | A* | 2 |
| Ex. 10 | A | 15 | 50 | 5.0 | 1000 | 3 | 0.93 | 2 | 1.5 | −0.1 | 0.0 | A* | A* | 1 |
| Ex. 11 | A | 15 | 50 | 5.0 | 1000 | 3 | 0.93 | 1.9 | 1.6 | −0.1 | 0.0 | A* | A* | 0 |
| Comp. Ex. 1 | J | 10 | 55 | 5.5 | 600 | 3 | 0.93 | 2.7 | 0.7 | −0.6 | −1.0 | U* | U* | 23 |
| Comp. Ex. 2 | K | 45 | 8 | 0.1 | 5000 | 3 | 0.89 | 3.5 | 0.0 | −0.8 | −1.1 | U* | U* | 18 |
| Comp. Ex. 3 | L | 5 | 67 | 8.7 | 6000 | 3 | 0.88 | 3.5 | 0.0 | −1.0 | −1.3 | U* | U* | 21 |
| Comp. Ex. 4 | M | 20 | 53 | 5.0 | 600 | 3 | 0.90 | 3.1 | −0.3 | −0.4 | −0.9 | U* | U* | 19 |
| Comp. Ex. 5 | P | 0 | 69 | 8.0 |  | 2 | 0.89 | 3.5 | 0.0 | −0.9 | −1.1 | U* | U* | 18 |
| Comp. Ex. 6 | J | 10 | 55 | 5.5 | 600 | 3 | 0.92 | 2.6 | 0.5 | −0.5 | −0.7 | U* | U* | 21 |

EM: Electromagnetic characteristics
DA: Dispersion stability
OC: Output change
DF: Dust and fluff accumulation
S: Still
DO: DO increase
A*: Acceptable
U*: Unacceptable As can be appreciated from the foregoing, the binder for magnetic recording media which contains the polyurethane according to the present invention improves the dispersibility of ferromagnetic powders and the electromagnetic characteristics of magnetic recording media, provides a coating film of increased strength, and achieves magnetic recording media which are particularly improved in terms of still life, and dust and fluff accumulating on heads. Unexpectedly, the presently invented binder serves well to extend the pot life of a coating solution, and so makes a great contribution to the production of magnetic recording media.

What we claim is:

1. A magnetic recording medium including a non-magnetic support substrate and a magnetic layer formed on said support substrate, said magnetic layer comprising a dispersion of ferromagnetic fine powders in a binder, characterized in that:

said binder comprises a polyurethane resin that is a reaction product obtained by reacting a polyol and an organic diisocyanate as main starting materials, said polyurethane resin containing as components of said polyol 15 to 40% by weight of the total quantity of urethane resin of a short-chain diol component with a cyclic structure, said short-chain diol component having a molecular weight of less than 500, and 10 to 50% by weight of the total quantity of urethane resin of a long-chain polyether polyol component, and further including a polar group-containing long-chain polyol component having a weight average molecular weight of 500 to 5,000.

2. The magnetic recording medium according to claim 1, characterized in that the polar group-containing long-chain polyol component contains a polar group at an amount of $1 \times 10^{-5}$ eq/g to $2 \times 10^{-4}$ eq/g with respect to the overall polyurethane resin.

3. The magnetic recording medium according to claim 1, characterized in that the polar group-containing long-chain polyol component contains at least one polar group selected from the group consisting of $-SO_3M$, $-OSO_3M$, $-COOM$, $-PO_3M_2$, $-OPO_3M_2$, $-NR_2$ and $-N^+R_2R'COO^-$ where M is a hydrogen atom, an alkali metal or ammonium, and R and R' each are an alkyl group having 1 to 12 carbon atoms.

4. The magnetic recording medium according to claim 1, characterized in that the polyurethane resin contains 3 to 20 OH groups per molecule.

5. A magnetic recording medium according to claim 1 in which a coating solution comprising a dispersion of ferromagnetic powders in the binder as recited in claim 1 is coated on a non-magnetic support substrate to form a magnetic layer thereon, characterized in that:

a non-magnetic layer comprising a dispersion of inorganic non-magnetic powders in a binder is intercalated between the non-magnetic support substrate and the magnetic layer, and the magnetic layer has a thickness of up to 1 μm.

6. The magnetic recording medium according to claim 5, characterized in that a polyurethane resin that is a reaction product obtained by reacting a polyol and an organic diisocyanate as main starting materials, said polyurethane resin containing as components of said polyol 15 to 40% by weight of the total quantity of urethane resin of a short-chain diol component having a cyclic structure, said short-chain diol component having a molecular weight of less than 500, and 10 to 50% by weight of the total quantity of urethane resin of a long-chain polyether polyol component, and further including a polar group-containing long-chain polyol component having a weight average molecular weight of 500 to 5,000 is the binder for dispersing the inorganic non-magnetic powders therein.

* * * * *

UNITED STATES PATENT AND TRADEMARK OFFICE
CERTIFICATE OF CORRECTION

PATENT NO. : 5,747,157
DATED : May 5, 1998
INVENTOR(S) : Hashimoto, et. al.

It is certified that error appears in the above-identified patent and that said Letters Patent is hereby corrected as shown below:

Column 18, line 37, change "ammonium," to -- an ammonium group,--.

Signed and Sealed this

Ninth Day of February, 1999

Attest:

Attesting Officer

Acting Commissioner of Patents and Trademarks